Nov. 26, 1963  R. E. COUTANT  3,111,858
VARIABLE RATIO TRANSMISSION MECHANISM
Filed April 30, 1962  5 Sheets-Sheet 1

Inventor:
Ralph E. Coutant,
by H. F. Manbeck, Jr.
Attorney.

Nov. 26, 1963 R. E. COUTANT 3,111,858
VARIABLE RATIO TRANSMISSION MECHANISM
Filed April 30, 1962 5 Sheets-Sheet 2

Inventor:
Ralph E. Coutant,
by H. F. Manbeck, Jr.
Attorney.

Nov. 26, 1963 R. E. COUTANT 3,111,858
VARIABLE RATIO TRANSMISSION MECHANISM
Filed April 30, 1962 5 Sheets-Sheet 3

Inventor:
Ralph E. Coutant,
by H. F. Manleck, Jr.
Attorney.

Nov. 26, 1963 R. E. COUTANT 3,111,858
VARIABLE RATIO TRANSMISSION MECHANISM
Filed April 30, 1962 5 Sheets-Sheet 4

Inventor:
Ralph E. Coutant,
by H. F. Maubeck, Jr.
Attorney.

United States Patent Office 3,111,858
Patented Nov. 26, 1963

3,111,858
VARIABLE RATIO TRANSMISSION MECHANISM
Ralph E. Coutant, Wyckoff, N.J., assignor to General
Electric Company, a corporation of New York
Filed Apr. 30, 1962, Ser. No. 190,916
8 Claims. (Cl. 74—230.17)

My invention relates to adjustable ratio transmission mechanisms and more particularly to such mechanism in which the variation in the speed ratio between the driving and driven shafts is obtained by means of a drive belt coupling these two shafts.

In adjustable speed belt drive mechanisms the variation in the speed ratio is obtained by varying the effective diameters of the pulleys on the driving and driven shafts. The pulleys are each provided with oppositely disposed coned pulley sections and in each pulley one of these sections is movable axially along the shaft. Means are provided for adjusting the movable section of one of the pulleys relative to its axially fixed cooperating section, and as this section is moved toward or away from the other section an opposite movement is effected of the movable pulley section on the other shaft. The drive belt is of the wedge or V type and as the control pulley section is adjusted so as to allow the belt to move inwardly toward its shaft or alternately to force the belt outwardly away from the shaft, the changing pull on the belt results in an opposite adjustment of the movable pulley section on the other shaft. Thus, if the control section is moved so as to decrease the effective diameter of its pulley, the movable section of the other pulley is adjusted so as to increase its diameter; and the converse is true, if the control pulley section is adjusted in the other direction. As a result of the effective diameters of the pulleys being changed in opposite directions the speed ratio between the driving and driven shafts may be varied over a wide range.

Figure 11:
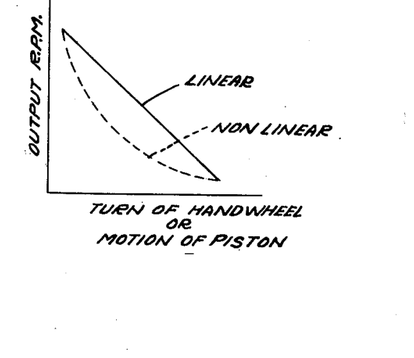
FIG. 11 is a graph showing the linear adjustment of the output speed which is obtained in both forms of the invention, as contrasted to the non-linear type of adjustment obtained in certain prior drives.

The control mechanism for adjusting the drive may be actuated in a number of ways. The most common way is by means of a rotatable hand wheel but pneumatically actuated pistons and electrically operated controls are also used. For many applications it is desirable, if not essential, that the adjustment of the output speed of the drive be linear with the amount of movement of the control member. In other words the change in the output speed over the total range of adjustment should be proportional in each instance to the amount of movement of the control member. Thus in a manual control each turn of the handwheel should result in the same change in the output speed of the drive while in a pneumatic control each inch of movement of the piston should cause the same change in the output speed. In an electrical control the actuator could be either a rotatable or longitudinally movable member but the same relationship is desirable for it too; the change in the speed of the drive should be linear with the movement of the actuator. In graphic form the linear function desired is shown in FIG. 11 as contrasted with the non-linear control attained in certain devices built heretofore.

It is therefore a primary object of my invention to provide a new and improved control for an adjustable speed drive mechanism, which will produce a linear adjustment of the output speed; and it is a more specific object of my invention to provide such a linear control which may be readily actuated by either a rotatable actuator, such as a handwheel, or by a longitudinally movable actuator, such as a piston.

In carrying out my invention in one form thereof, I apply it to an adjustable speed drive unit having a driving shaft and a driven shaft each of which mounts an adjustable pulley structure. The pulley structures are connected by a drive belt and the output speed is varied by adjusting one of the pulley structures. The means for adjusting the one pulley structure includes a normally non-rotatable control collar which is disposed on the shaft mounting the pulley structure and which is connected to move one of its sections relative to the other. In accordance with my invention, the control collar is actuated from an actuating member which is movable in a straight line or linear path. The actuating member can be, for example, the traveling nut on a rotatable lead screw, or a pneumatic piston, and it has mounted on it a pair of control links. The links are preferably pivotally mounted to the actuating member and they are movable with it as it travels in its linear path. The control links engage the control collar on opposite sides of the shaft mounting it and they also engage a pair of stationary camming members. The camming members contact the links on the opposite edges thereof from the control collar and thereby the links are constrained between the camming members and the control collar to cause adjustment of the control collar upon movement of the actuating member. Suitable camming surfaces may be provided at the points of engagement of the links with the control collar and the camming member to cause the variation in the speed of the driven shaft to be directly proportional, i.e., linear, to the amount of movement of the actuating member.

The subject matter which I regard as my invention is particularly pointed out and distinctly claimed in the concluding portion of this specification. My invention, however, both as to organization and method of operation, together with further objects and advantages thereof, may best be understood by reference to the following description taken in conjunction with the accompanying drawings in which:

Figure 1:
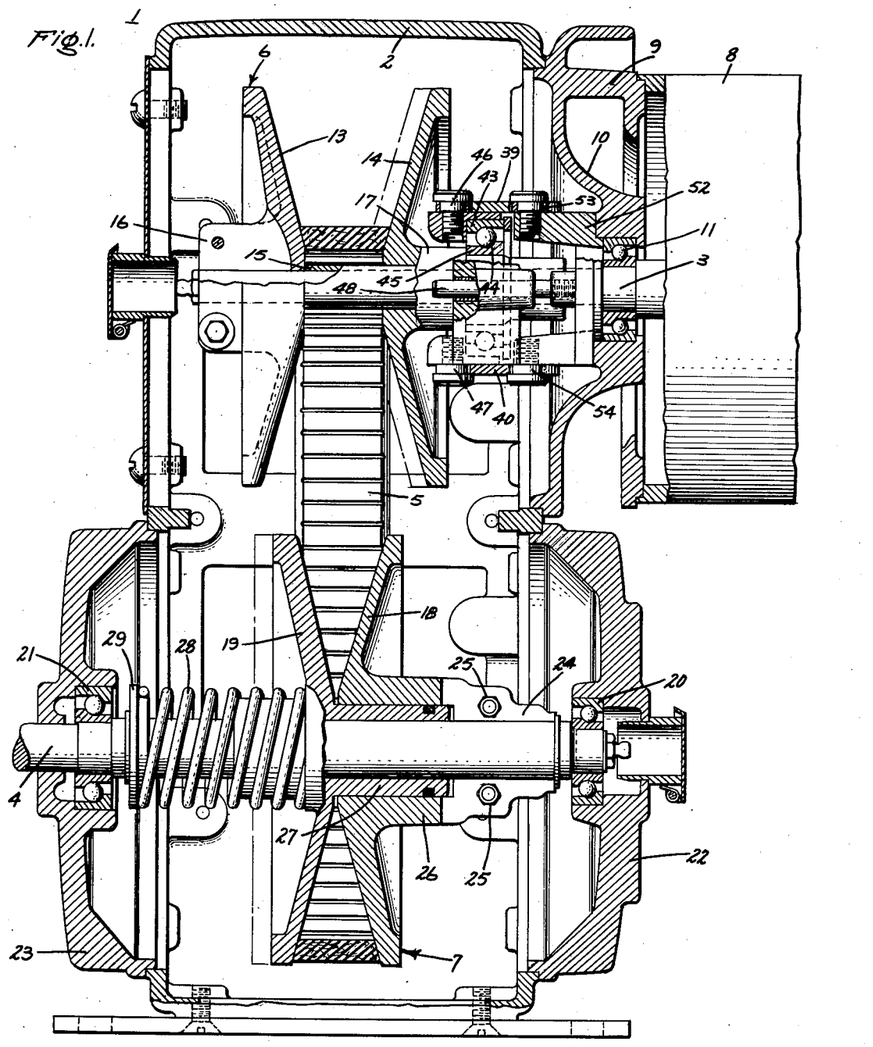
FIG. 1 is a side elevational view of a variable ratio transmission drive mechanism embodying my invention, the view being partially broken away and partially in section to show details.

Referring now to FIG. 1, I have shown therein an adjustable ratio transmission mechanism 1 embodying my invention in one form thereof. The mechanism or drive 1 includes a main housing or frame 2 within which are mounted the various operating components of the mechanism. As shown, the mechanism includes a driving shaft 3 and a driven or output shaft 4 which are coupled together by means of a wedge shaped belt 5. The belt 5 is disposed between adjustable pulley structures 6 and 7 and, as will be more fully explained hereinafter, the relative effective pulley diameters of the pulley structures 6 and 7 are varied in order to change the speed ratios between the driving and driven shafts.

The transmission mechanism 1 is powered by an electric motor 8 which is mounted on the housing or frame 2 by means of an annular adapter or connector 9. Besides mounting the motor on the housing the adapted 9 also supports one of the bearings for the driving shaft 3. Specifically the adapter includes a spider 10 which supports a ball bearing assembly 11. The ball bearing assembly 11 forms the inboard bearing for the drive shaft 3 and it will be understood that the outboard bearing of the shaft is supported in the usual manner in the end shield (not shown) of the motor 8.

The adjustable pulley section 6 is supported on the outer section of the shaft 3, which in the embodiment of FIGS. 1–6 is overhung from the bearing assembly 11. As shown, the pulley structure 6 includes a pair of oppositely disposed coned pulley sections 13 and 14. The left hand pulley section 13 is axially fixed with regard to the shaft 3, its hub being secured firmly to the shaft for rotation therewith. At its inner end the hub of the pulley 13 abuts a shoulder 15 formed on shaft 3 and at its outer end the hub is provided with a split collar 16 which is drawn together by means of suitable bolts so as to hold the pulley section fixedly in the position shown.

The second pulley section 14 is arranged for rotation with the shaft 3 but unlike the fixed section 13, it is arranged to move axially along the shaft 3. To this end the pulley section 14 is formed integrally with a sleeve 17 which is positioned on the shaft 3 and is connected for rotation with the shaft. The connection of the sleeve or hub 17 to the shaft is made by axially extending splines (not shown) which engage similar splines on the shaft 3 so as to drive the sleeve from the shaft but permit it to be moved axially along the shaft. As will be more fully explained hereinafter, the sleeve 17 is adjusted axially on the shaft 3 thereby to move the pulley section 14 relative to the pulley section 13. This adjusts the effective diameter of the driving pulley structure 6 and results in the speed ratio being changed between the driving and driven shafts.

The pulley structure 7 on the driven shaft 4 likewise comprises a pair of oppositely disposed coned pulley sections, namely the pulley sections 18 and 19. The driven shaft 4 is mounted in ball bearing assemblies 20 and 21 supported in removable end plates 22 and 23 of housing 2, and the pulley structure 7 is mounted on the shaft between these bearing assemblies. As shown, the pulley section 18 includes a split hub or collar portion 24 which is fixedly attached to the driven shaft by means of clamp bolts 25. Between the main flange or cone of the pulley section 18 and the hub 24 there is a connecting portion or sleeve 26 which is spaced away from the shaft 4. The clearance between the sleeve portion 26 and the shaft 4 provides a space for accommodating the right hand end (as viewed in FIG. 1) of a sleeve 27 mounting the adjustable pulley section 19. The pulley section 19 is formed integrally with the sleeve 27 and thereby moves with it at all times. The sleeve 27 is keyed to the driven shaft 4 by means of suitable splines (not shown) so that it will rotate with the shaft but may move axially on it. Thus the pulley section 19 may be moved toward or away from the pulley section 18 to adjust the effective diameter of the driven pulley structure 7. The movable section 19 is biased toward the fixed section 18 by means of a strong coil spring 28 which is mounted between the section 19 and an axially fixed retaining ring 29 mounted on the shaft. In FIG. 1 the spring 28 is shown as biasing the pulley section 19 to the maximum effective diameter position for the driven pulley 7.

Figure 7:
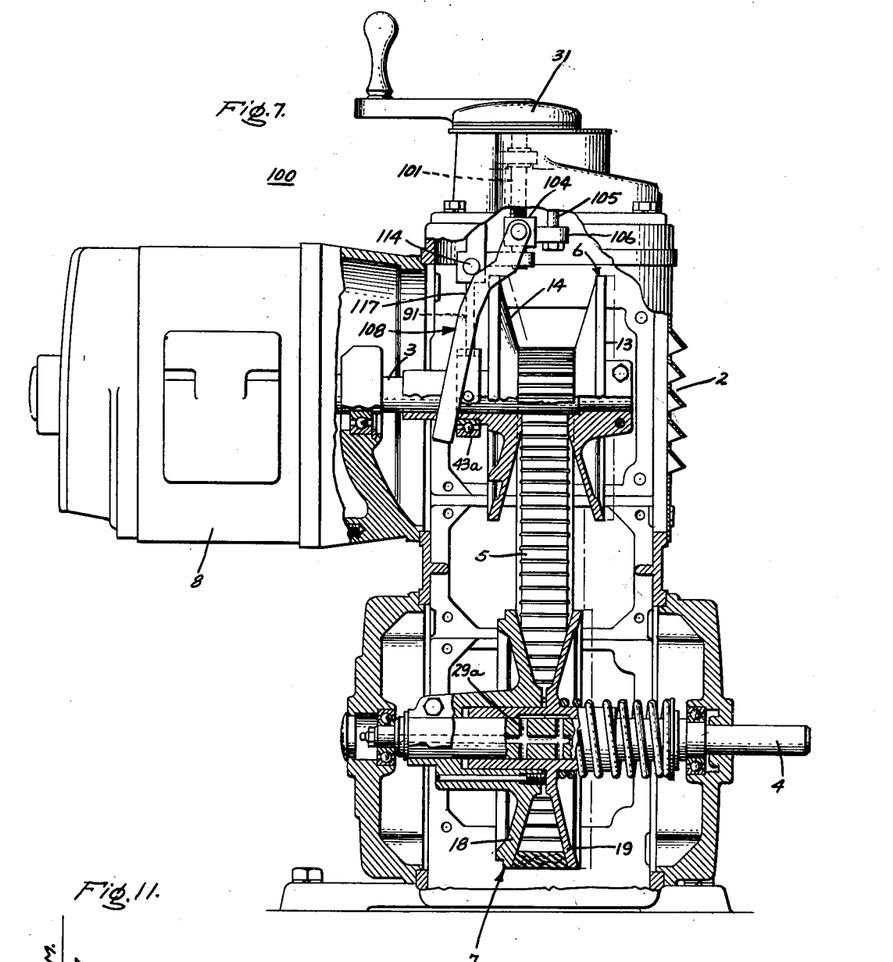
FIG. 7 is a side elevational view, partially broken away and partially in section, of a variable ratio drive mechanism embodying my invention in a second form thereof.

The sleeve 27 may be lubricated to provide for easy movement on the shaft by means of suitable lubricant passageways formed in the shaft 4, such passageways being shown at 29a in FIG. 7 which illustrates an alternate form of my invention. It will be understood that similar lubricant passageways may be formed in the shaft 3 for lubricating the inner surface of the sleeve member 17.

In order to adjust the pulley structures 6 and 7 the mechanism 1 is provided with an improved control unit which forms an important aspect of my invention. This control unit is mounted on one side of the housing or frame 2 of the mechanism as may be best seen in FIGS. 2 and 3, and it includes an actuating or adjusting member 30 which moves in a linear path upon the rotation of an external handwheel 31. Specifically, the adjusting member 30 comprises an elongated lead screw which is threaded into an internally threaded sleeve or nut member 32. The internally threaded sleeve 32 is rotatably mounted by means of a ball bearing assembly 33 and it carries the handwheel 31 at its outer end, the handwheel being attached thereto by means of a screw 34. With this arrangement it will be seen that as the handwheel 31 is turned it will rotate the sleeve or nut 32 and this rotation will cause the screw or actuating member 30 to move in a linear path into or out of the sleeve 32.

Figure 3:
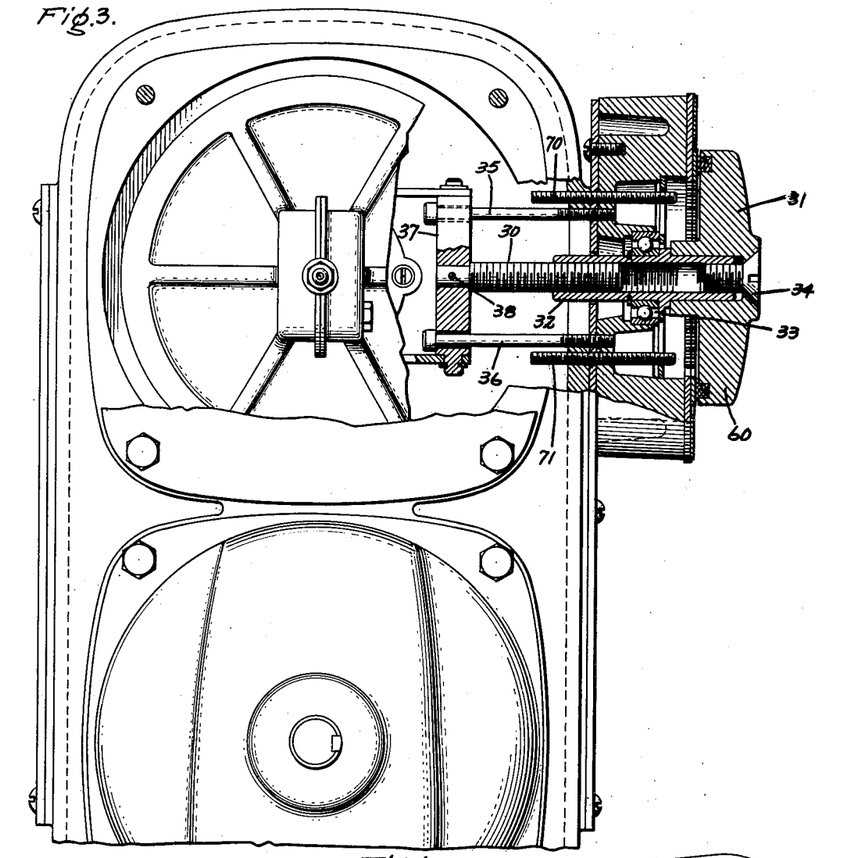
FIG. 3 is an end view of the drive mechanism partially broken away and with the control mechanism being shown in section as taken along the line 3—3 of FIG. 2.
Figure 6:
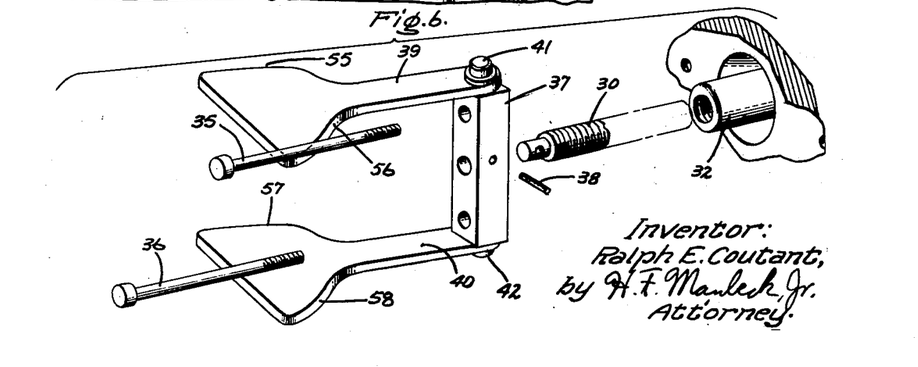
FIG. 6 is an exploded view further illustrating details of the control mechanism.

For the lead screw 30 to move in a linear path it is necessary that it not be rotatable with the nut member and to assure this the member 30 is held from rotation by means of a pair of elongated pins 35 and 36 (FIGS. 3 and 6). The pins 35 and 36 extend through slots in a cross bar 37 which is mounted at the end of the lead screw 30 by means of a rivet 38. The cross bar 37 is free to move along the pins 35 and 36 as it is carried by the lead screw but the pins prevent it and the lead screw from rotating whereby axial movement of the screw and cross bar is assured whenever the handwheel is turned.

The axial or straight line movement of the lead screw 30 and the cross bar 37 is utilized to adjust the position of the pulley section 14 of the driving pulley 6, thereby to adjust the relative effective diameters of the pulleys 6 and 7. The movement of the lead screw is transmitted to the driving pulley by means of a pair of links 39 and 40 mounted on the cross bar 37. Specifically, the links 39 and 40 are pivotally mounted on the cross bar at their outer extremities by means of trunnions or pivots 41 and 42 provided at the opposite ends of the cross bar. At their inner ends the links fit between a control collar provided on the sleeve 17 and stationary camming means mounted by the main frame of the mechanism. The control collar comprises the outer race 43 of a ball bearing assembly 44 whose inner race 45 is firmly secured to the axially movable sleeve 17 (see FIG. 1). The outer race or collar 43 is provided with a pair of pins or rollers 46 and 47 and it is these rollers which are engaged respectively by the links 39 and 40. Since the inner race 45 of bearing assembly 44 is fixedly secured to the sleeve 17, any axial movement of the collar 43 as actuated by the links will cause a similar movement of the pulley section 14.

It will be noted that the collar 43 is restrained from rotation to insure continuous contact between the links and the rollers or pins 46 and 47 of the collar. The anti-rotation means comprises a pair of elongated pins or rods 48 and 49 which pass through suitable slots formed in flanges 50 and 51 of the collar. The rods 48 and 49 are held at their right hand ends (as viewed in FIGS. 1 and 5) by a stationary sleeve 52 mounted by the spider 11, but any suitable mounting means may be used.

As mentioned above the links 39 and 40 in addition to engaging the rollers 46 and 47 of the control collar also engage stationary camming means provided on the frame of the mechanism. Specifically, this stationary camming means comprises the rollers or pins 53 and 54 mounted by the stationary sleeve 52. It will be noted from FIGS. 1 and 5 that the stationary camming means or rollers 53, 54 engage the links on their opposite edges from the rollers 46, 47 of the control collar 43. Thus the links are constrained between the movable collar 43 and the stationary camming means 53, 54 to adjust the collar as the lead screw 30 and cross bar 37 are moved in a linear fashion.

To obtain the desired adjustment of the control pulley section 14 upon the movement of the lead screw, the links 39 and 40 are provided with suitable cam surfaces at their inner ends in the regions where they engage the rollers 46 and 47 of the control collar and the stationary camming rollers 53 and 54. Referring particularly to FIG. 6 it will be noted that the link 39 is provided with the cam surfaces 55 and 56 on its opposite edges while the link 40 is provided with identical surfaces 57 and 58. The rear surfaces 55, 57 engage the stationary camming rollers while the front surfaces 56, 58 engage the rollers on the control collar. It will be seen that as the lead screw 30 and cross bar 37 move inwardly and outwardly, the camming surfaces 55—58 will cause not only pivoting of the links but also a movement of the control collar 43 and the pulley 14 along the shaft. The contact between the rear camming surfaces 55, 57 and the stationary rollers 53, 54 causes pivoting of the links and this in itself results in some movement of the control collar. The front surfaces 56, 58 move the collar as the links pivot and also by their shape they add some additional control to the amount of movement of the collar. The shape of the cam surfaces thus determines the amount of movement of the collar 43 and the pulley section 14 for each increment of movement of the lead screw and cross bar.

In the embodiment of FIGS. 1–6 the cam surfaces are so designed that the control collar will be moved to provide a linear adjustment of the drive. In other words, the control collar will be moved axially in response to the linear or axial movement of the lead screw 30 so as to provide an adjustment of the output speed of the drive which is directly proportional to the amount of movement of the lead screw no matter where in the speed range the adjustment may occur. It will be noted that adjustment of the output speed is also linear with the amount of rotation of the handwheel 31 since the threaded connection between the nut member 32 and the lead screw 30 provides a uniform advance of the lead screw for each turn of the handwheel 31. In particular, the output speed plotted against the number of turns of the handwheel will follow a linear curve such as that shown in FIG. 11. Of course, as the lead screw and the outer ends of the links are moved outwardly from the shaft 3, the control collar will be shifted toward the left (as viewed in FIGS. 1 and 5) so as to increase the effective diameter of the pulley 6 whereas if the lead screw and the links are moved inwardly, the collar and pulley section 14 will move to the right so as to decrease the effective diameter of pulley 6. In FIG. 1 the pulley section 14 is shown at its extreme right hand position giving the minimum pulley diameter and the minimum output speed.

To explain briefly the manner in which the movement of the control pulley section 14 causes a variation in the speed ratio, assume the pulley section 14 to be in the full line position shown in FIG. 1. Then if the control links 39, 40 are moved outwardly by means of the lead screw 30 and cross bar 37, the control collar 43 and the pulley section 14 will be moved to the left against the side force exerted by the belt 5. The side force of the belt is always such as to force pulley sections apart. As the pulley section 14 moves to the left it will necessarily cause the belt 5 to move upwardly between it and the fixed pulley section 13. In other words, the effective diameter of the driving pulley structure will be increased, with the belt 5 and the control section assuming the positions shown by the dotted lines. As the effective diameter of the driving pulley structure 6 is changed, this, of course, places an upward force on the belt 5 and this force is such as to tend to move the adjustable section 19 of the driven pulley structure to the left. Thus as the effective diameter of the driving pulley structure increases the movable section 19 of the driven pulley structure moves to the left, as indicated by the dotted lines, to decrease the effective diameter of the driven pulley. With the effective diameter of the driven pulley decreasing as that of the driving pulley increases, a change in the speed ratio between the shafts is effected with the driven shaft speeding up with regard to the driving shaft.

To return the drive to its original setting, or to any speed ratio therebetween, the handwheel 31 is merely turned in the opposite direction moving the lead screw 30 and the links 39 and 40 inwardly. This allows the side force of the belt to force the pulley section 14 to the right. As the pulley section 14 moves to the right the belt 5 shifts downwardly and to the right in the pulley structure 6. This causes the belt to slacken and as a result it also moves downwardly in the driven pulley structure 7, this effect occurring because of the centrifugal forces acting on the belt and the thrust exerted by the spring 28. As the belt so moves downward, the spring 28 moves the pulley section 19 also to the right whereby the effective diameter of the driven pulley increases as that of the driving pulley decreases. Thus, it will be seen that the movable pulley sections 14 and 19 are adjusted oppositely in response to the actuation of the links 35 and 36 by the linear or axial movement of the lead screw 30 to effect any desired speed ratio between the driving and driven shafts. For example, in one drive unit embodying the structure of FIGS. 1–6, and having driving and driven pulleys six inches and six and one-half inches, respectively, in diameter mounted on shafts spaced seven inches apart, the output speed may be varied smoothly between 4200 and 420 r.p.m. when the input shaft is driven at 1725 r.p.m.

The pivoting of the links resulting from the cam surfaces 55, 57 together with the axial thrust provided by the cam surfaces 56, 58 causes the adjustment in the output speed to be linear with the amount of movement of the lead screw 30. In other words, for each increment of movement of the lead screw caused by each turn of the handwheel 31 the output speed of the drive is changed a like amount. This function is, of course, shown by the "linear" curve in FIG. 11. It will be noted that other axially moving elements, such as, for example, a pneumatically operated piston, could be substituted for the lead screw 30 and the same function would occur. Also, the rotary nut member 32 could be turned by an electrically or hydraulically driven motor, for example, a servo motor, and the adjustment of the output speed would be linear with the amount of rotation of the motor. Thus the means by which cross bar 37 is moved does not affect the function obtained; the output speed will still be changed proportionally with amount of movement of the cross bar to give a linear control.

Figure 2:
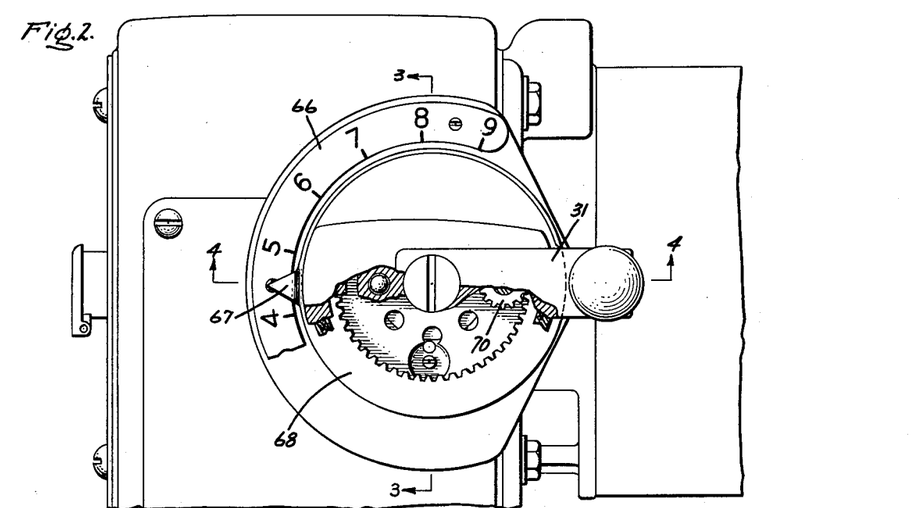
FIG. 2 is a fragmentary side view of the drive mechanism showing the handwheel and associated indicating means of the control mechanism.
Figures 4, 5:
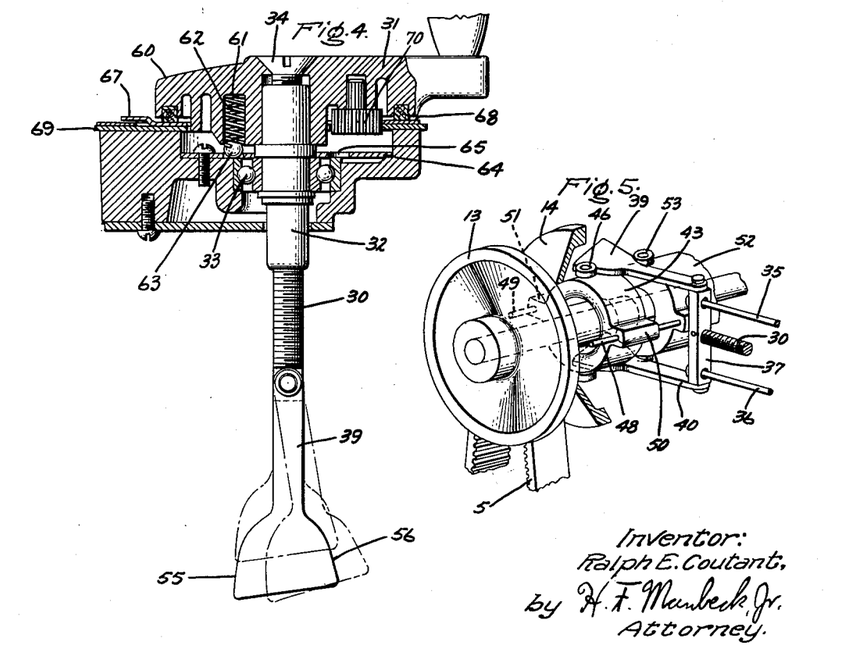
FIG. 4 is a sectional view taken on the line 4—4 of FIG. 2, and showing certain details of the control mechanism.
FIG. 5 is a perspective view showing the operating relationship of the principal parts of the control mechanism.

Referring to FIGS. 2–4 it will be noted that the handle 31 is provided with a circular section 60 disposed around the top of the threaded nut or sleeve 32. This section 60 includes a recess 61 in which is positioned a detent spring 62 (FIG. 4). The spring 62 biases a detent ball 63 downwardly into contact with a plate 64 which overlies the bearing assembly 33 for the rotatable nut 32. The plate 64 is provided with a plurality of spaced apart apertures 65 and the ball 63 is engageable in these various apertures as the control handle is turned. It will be seen that when the handle is turned to any particular position the ball 63 is biased into the aperture 64 corresponding that position to hold the control handle. In other words, the spring 62 and ball 63 provide a detent means for holding the control mechanism and thereby the control pulley section 14 in any desired position of adjustment.

Besides the control components and the detent means, the control unit also includes an indicating mechanism for showing the relative position of adjustment of the drive. Referring to FIGS. 2 and 4 it will be seen that the indicating mechanism includes a semi-circular scale 66 which is fixedly mounted on the machine housing and a rotating pointer 67 which cooperates with this scale. The pointer 67 is mounted on an internal ring gear 68 which is rotatably mounted between a fixed internal ring gear 69 and the circular portion 60 of the handle. A pinion 70 which is rotatably carried by the handle mates with the movable ring gear 68 and the fixed ring gear 69 so as to drive the gear 68 during rotation of the handle. The drive of the gear 68 is obviously of the planetary type providing a reduction effect between the handle and the gear 68. Thus the indicator 67 moves slowly along scale 66 as the handle 31 is turned and thereby gives an accurate indication of the position of adjustment of the drive. It will be understood that both this indicating means and the control means are not essential to the present invention but are desirable features which may be advantageously incorporated in the mechanism.

It will also be noted that adjustable means are provided in the control to limit the extent of movement of the cross bar 37 and thereby the extent of adjustment of the output speed of the drive. These means comprise the rods 35, 36 whose heads limit the inward travel of the cross bar, and a pair of elongated bolts 71, 72 which engage the outer face of the cross bar to limit its outward travel (see FIG. 3). Both the rods 35, 36 and the bolts 70, 71 are threadably mounted in the housing frame so that they may be turned and thereby adjusted axially to the desired position.

Referring now to FIGS. 7–10, I have shown therein a drive mechanism 100 which incorporates my invention in an alternate form thereof. The general arrangement of the mechanism including the drive motor 8, the driving and driven shafts 3 and 4, the pulley structures 6 and 7 and the belt 5, is the same as in the drive 1 and therefore similar parts have been identified by the same numbers. In this regard it will be noted that the mechanism 100 is shown from the opposite side than the drive 1 whereby the movable pulley section 14 of the driving pulley now appears on the left rather than on the right and the movable section 19 of the driven pulley appears on the right rather than on the left. In the machine 100 the control mechanism for adjusting the movable pulley section 14 differs in certain respects from the control of the first embodiment. In this alternative embodiment a non-rotatable control collar 43a (comprising the outer race of a ball bearing assembly as in the first embodiment) is mounted on the sleeve 17 of the pulley section 14 so as to move it axially on the shaft, but the linkage means for moving the collar are somewhat different than in the first embodiment as will now be explained. The control collar 43a, it will be noted, is held from rotation by a stationary rod 91, the inner end of which fits into an axially extending slot 92 in outer surface of the collar (see FIG. 10). With this arrangement the collar 43a can move axially on the shaft without interference from the rod 91, but yet the cooperation between the rod and the slot will at all times restrain the collar from rotation. The rod 91 may be mounted by any suitable means and in the present embodiment is held by the base 115 of the lower lead screw mounting foot 103a.

Figures 8, 9, 10:
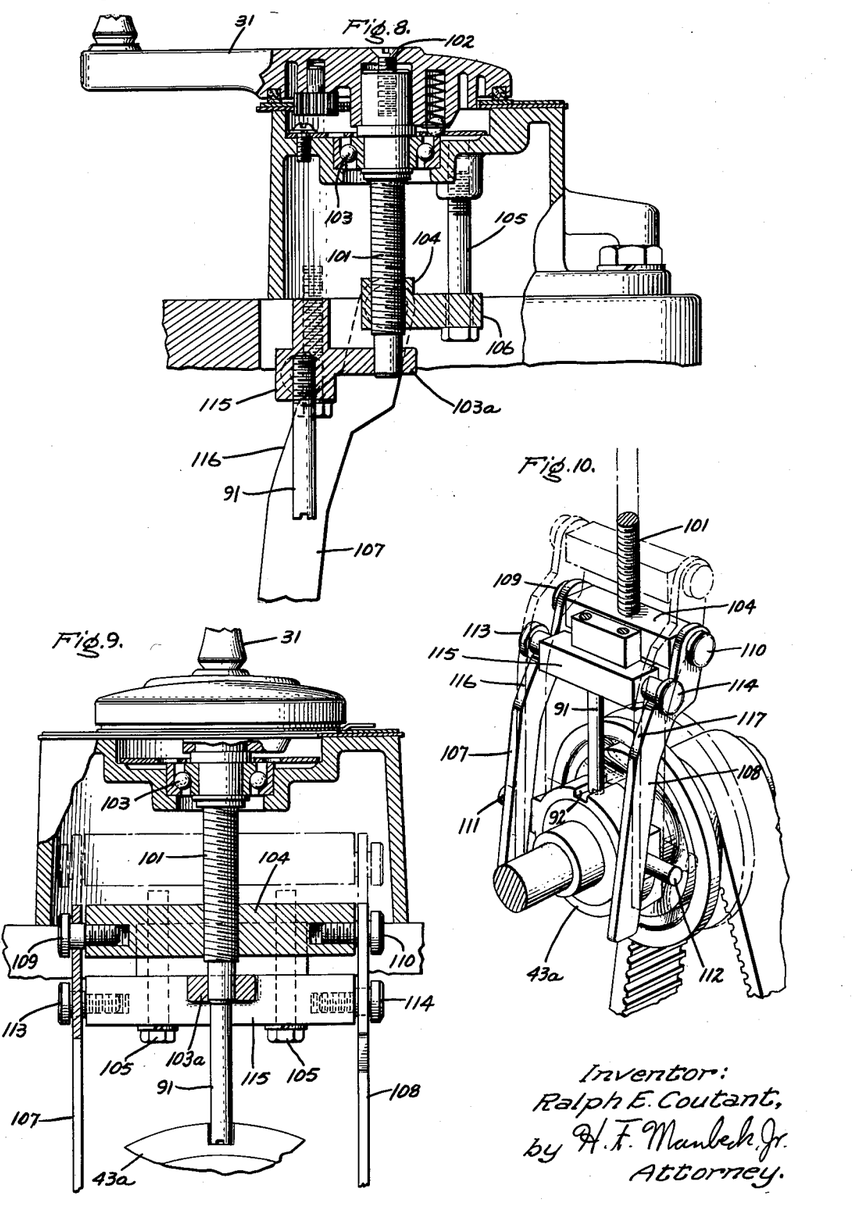
FIG. 8 is a vertical section showing details of the alternate form of control mechanism included in the drive of FIG. 7.
FIG. 9 is another sectional view of the alternate form of the control mechanism, this view being taken at right angles to the section of FIG. 8.
FIG. 10 is a fragmentary perspective view showing additional details of the alternate form of the mechanism.

Referring first to FIGS. 7 and 8 it will be seen that the handwheel 31 now located on top of the housing 2 is attached to an axially fixed, rotatable lead screw 101 by a suitable screw 102. The lead screw 101 is mounted by means of an upper ball bearing assembly 103 and a lower mounting foot 103a, and threaded on it is a non-rotatable nut 104. The nut 104 is restrained from rotation by means of pins 105 which pass through suitable slots provided in a flange 106 of the nut and thereby as the lead screw is turned the nut 104 will travel up and down on it. As is best seen in FIGS. 9 and 10 the nut 104 is an elongated member being in effect both a nut and a cross bar formed integrally together, and at its opposite ends it carries a pair of links 107, 108. Specifically, the links are pivotably mounted at the ends of the nut or cross bar by means of trunnions or pivot pins 109, 110.

The links 107, 108 extend inwardly toward the driving shaft 3 and at their inner ends they engage the control collar 43a on opposite sides of the shaft. Specifically, they engage pins 111, 112 provided on the control collar. The pins 111 and 112 do not have rollers thereon as shown in the drawings but it will be obvious that rollers could be readily added if desired. Besides engaging the control collar the links also engage stationary camming means provided on the mechanism housing. Specifically they engage a pair of pins or rollers 113, 114 which are fixedly mounted on the machine frame spaced radially outwardly from the drive shaft. The base 115 of the screw mounting foot 103a may advantageously serve as the mounting means for the rollers 113, 114 as shown in FIGS. 9 and 10. The stationary camming pins or rollers 113, 114 engage the links 107, 108 on the opposite edges thereof from pins 111, 112 of the control collar and thereby the links 107, 108 are constrained between the two sets of pins. As the links are carried in or out by the nut 104 traveling on the lead screw, as indicated by the dotted lines in FIGS. 9 and 10, the contact of the links with the stationary pins 113, 114 causes a pivoting of the links. This pivoting action of the links in turn shifts the control collar on the shaft to adjust the speed of the drive mechanism.

It will be noted that the stationary camming pins 113, 114 are offset laterally from the axis of the lead screw 101 and also they are disposed outwardly from the shaft 3. With this arrangement the camming pins 113, 114 engage the links nearer to their pivots 109, 110 than does the control collar. A multiplying effect is thereby induced into the movement of the links. In other words as the stationary pins or rollers 113, 114 cause a turning of the links near their pivots, this movement is accentuated at the ends of the links engaging the control collar. The multiplying effect together with suitable cam surfaces 116, 117 provided on the respective links 107, 108 causes a linear adjustment of the output speed of the mechanism. In other words for each turn of the handwheel 31, the output speed is changed the same amount no matter where the drive may be operating in its overall speed range. As indicated above, the cam surfaces 116, 117 provided on the links aid in obtaining the linear adjustment function. Specifically these cam surfaces are located in the region where the links 107, 108 engage the stationary cam pins 113, 114 as the links are moved in and out by the crossbar or nut 104. The cam surfaces, of course, contribute to the overall pivotal movement of the links, and the cam surfaces can be varied suitably to obtain the right motion of the links for linear adjustment. It will be noted, however, that cam surfaces are not provided on the links in the region where they engage the pins on the control collar. This is not necessary in the embodiment of FIGS. 7–10 since the multiplying effect together with the cam surfaces 116, 117 is sufficient to provide the linear control effect. However, it will be obvious that cam surfaces could be readily added in the regions where the links engage the control collar if this were necessary or desirable.

Thus it will be seen that in both of the illustrated embodiments a linear adjustment of a variable speed drive mechanism is obtained by means of pivoted links which are constrained between stationary camming means on the main frame and suitable pins or rollers on the control collar. As the actuating member, such as, for example, a lead screw or traveling nut, is moved in and out in a linear path, the links are carried with it and are caused to pivot by the stationary camming means. The cam surfaces, and the motion multiplying effect in the second embodiment, cause the shifting of the control collar to be such that the speed of the drive is adjusted in a linear fashion with the movement of the actuating member. Since the links are actuated by a member moving in a straight line path, it will be seen that the control mechanisms of my invention are readily operable by a pneumatic piston, and, of course, an electric or hydraulic servo motor could be readily substituted for a rotatable handwheel also to obtain linear adjustment.

While in accordance with the patent statutes I have described what is considered to be the preferred embodiment of my invention it will be obvious to those skilled in the art that various changes and modifications may be made therein without departing from the invention and therefore it is intended in the appended claims to cover all such equivalent variations as fall within the spirit and true scope of the invention. As used herein the term "pin" as applied to both the stationary camming means on the machine frame and the link engaging means carried by the control collar is intended to cover such means whether or not they incorporate rollers to reduce friction during adjustment.

What I claim as new and desire to secure by Letters Patent of the United States is:

1. In a variable speed mechanism including a driving shaft, a driven shaft, pulley structures respectively mounted on said shafts, and a belt operatively connecting said pulley structures, said pulley structures each having a pair of relatively adjustable pulley sections having opposed belt engaging faces forming by relative axial adjustment variable effective pulley diameters; means of adjusting one of said pulley structures comprising a normally nonrotatable control collar disposed on the shaft mounting said one structure and connected to move one of its pulley sections relative to the other, an actuating member movable in a linear path, a pair of control links pivotally mounted on said actuating member and movable thereby, said links engaging said control collar on opposite sides of said one shaft remote from said actuating member for moving said collar, and a pair of stationary camming members engaging said links on the opposite edges of said links from the edges engaged by said control collar, whereby said links are constrained between said camming members and said control collar to pivot and cause adjustment of said control collar upon the linear movement of said actuating member.

2. The mechanism of claim 1 wherein said camming members are located outwardly from said one shaft to enhance the pivotal movement of said links upon the movement of said actuating member.

3. The mechanism of claim 1 wherein cam surfaces are provided at the interengaging regions of said links and said control collar to aid in controlling the degree of adjustment of said control collar.

4. In a variable speed mechanism including a driving shaft, a driven shaft, adjustable pulley structures respectively mounted on said shafts with each structure having a pair of relatively adjustable pulley sections, and a belt operatively connecting said pulley structures, means for adjusting one of said pulley structures comprising a control member disposed on the shaft mounting said one structure and connected to move one of its pulley sections relative to the other, an actuating member movable in a linear path, linkage means pivotally mounted on said actuating member and movable thereby, said linkage means engaging said control member remote from actuating member for moving said control member, and stationary camming means engaging said linkage means on the opposite edge of said linkage means from the edge engaged by said control member, whereby said linkage means is constrained between said camming means and said control member to pivot and cause adjustment of said control member upon the linear movement of said actuating member.

5. In a variable speed mechanism including a driving shaft, a driven shaft, adjustable pulley structures respectively mounted on said shafts, a belt operatively connecting said pulley structures, and a housing enclosing said shafts, said pulley structures and said belt; means for controlling the speed of said driven shaft comprising a normally nonrotatable control collar disposed on said driving shaft and connected to adjust the pulley structure mounted thereon, a rotatable axially fixed member supported by said housing, a non-rotatable adjusting member threaded to said axially fixed member and movable thereby in a linear path upon the rotation of said axially fixed member, a pair of control links pivotally mounted adjacent their outer ends on said adjusting member and movable thereby, said links engaging said control collar at their inner ends on opposite sides of said one shaft for moving said collar, and a pair of stationary camming pins supported by said housing and engaging said links on the opposite edges of said links from the edges engaged by said control collar, whereby said links are constrained between said camming pins and said control collar to cause adjustment of said control collar upon the rotation of said axially fixed member, said links including cam surfaces on at least the edges thereof engaging said pins for causing the variation in the speed of the driven shaft resulting from the control collar adjustment to be directly proportional to amount of rotation of said lead screw.

6. In a variable speed mechanism including a driving shaft, a driven shaft, adjustable pulley structures respectively mounted on said shafts, a belt operatively connecting said pulley structures and a housing enclosing said shafts, said pulley structures and said belt; means for controlling the speed of said driven shaft comprising a normally nonrotatable control collar disposed on one of said shafts and connected to adjust the pulley structure mounted thereon, an adjusting member disposed with said housing at least in part and movable in a linear path transverse to said one shaft, a pair of control links pivotally mounted adjacent their outer ends on said adjusting member and movable thereby, said links engaging said control collar at their inner ends on opposite sides of said one shaft for moving said collar, and a pair of stationary camming pins supported by said housing and engaging said links on the opposite edges of said links from the edges engaged by said control collar, whereby said links are constrained between said camming pins and said control collar to pivot and cause adjustment of said control collar upon the movement of said adjusting member, said links including cam surfaces on the opposite edges thereof engaging said control collar and said pins for causing the variation in the speed of the driven shaft resulting from the control collar adjustment to be directly proportional to amount of linear movement of said adjusting member.

7. In a variable speed mechanism including a driving shaft, a driven shaft, adjustable pulley structures respectively mounted on said shafts, a belt operatively connecting said pulley structures, and a housing enclosing said shafts, said pulley structures and said belt; means for controlling the speed of said driven shaft comprising a normally nonrotatable control collar disposed on one of said shafts and connected to adjust the pulley structure mounted thereon, an adjusting member disposed within said housing at least in part and movable in a linear path transverse to said one shaft, a pair of control links pivotally mounted adjacent their outer ends on said adjusting member and movable thereby, said links engaging said control collar at their inner ends on opposite sides of said one shaft for moving said collar, and a pair of stationary camming pins supported by said housing and engaging said links on the opposite edges of said links from the edges engaged by said control collar, whereby said links are constrained between said camming pins and said control collar to pivot and cause adjustment of said control collar upon the movement of said adjusting member, said camming pins being located outwardly from said one shaft to enhance the pivotal movement of said links upon the movement of said adjusting member and said links including cam surfaces on the edges thereof engaging said pins, thereby to cause the variation in the speed of the driven shaft resulting from the control collar adjustment to be directly proportional to the amount of the movement of said adjusting member.

8. In a variable speed mechanism including a driving shaft, a driven shaft, pulley structures respectively mounted on said shafts, and a belt operatively connecting said pulley structures, said pulley structures each having a pair of relatively adjustable pulley sections; means for adjusting one of said pulley structures comprising a normally nonrotatable control member disposed on the shaft mounting said one structure and connected to move one of its pulley sections relative to the other, an adjusting member movable in a linear path transverse to the axis of the shaft mounting said control collar, and cam means actuated by said adjusting member and engaging said control collar for shifting said control collar axially on its shaft, thereby to vary the speed of said mechanism and the operating speed of said driven shaft, said cam means being mechanically connected at one end to said adjusting member for linear movement therewith and including a cam surface effective to produce an adjustment in the speed of the driven shaft which is directly proportional to the amount of movement of said adjusting member.

References Cited in the file of this patent
UNITED STATES PATENTS

| | | |
|---|---|---|
| 2,277,004 | Reeves | Mar. 17, 1942 |
| 2,797,590 | Reeves | July 2, 1957 |